Clarence W. Brandon
INVENTOR.

Clarence W. Brandon
INVENTOR.

Clarence W. Brandon
INVENTOR.

BY Head + Johnson
Attorneys

United States Patent Office 3,220,476
Patented Nov. 30, 1965

3,220,476
METHOD FOR FLUID PRESSURE VIBRATORY FRACTURE OF FORMATIONS AND FLUID RECOVERY THEREFROM
Clarence W. Brandon, Tallahassee, Fla., assignor of five percent to Harvey B. Jacobson, Washington, D.C., twelve and one-half percent to Orpha Brandon, Tallahassee, Fla., and fifty percent to Nat A. Hardin, Catherine H. Newton, and Hazel H. Wright, jointly, all of Forsyth, Ga.
Continuation of application Ser. No. 832,882, Aug. 5, 1959. This application Oct. 11, 1963, Ser. No. 315,720
16 Claims. (Cl. 166—42)

This invention comprises novel and useful improvements in methods for fluid pressure vibratory fracturing of formations and fluid recovery therefrom, and more specifically pertains to a method for recovering oil from oil bearing formations and especially for the secondary recovery of oil therefrom, and constitutes a continuing application of my prior application Serial No. 832,882 filed August 5, 1959, now abandoned, which is a continuation-in-part of my prior applications Serial No. 490,482 filed February 25, 1955 and its improvement application Serial No. 491,715 filed, March 2, 1955, both now abandoned.

In certain subterranean geological formations from which it is desired to recover valuable fluids in the form of gases, liquids or both, it frequently happens that the formation is of such a nature that the interstices or pore spaces of the formation are of so small a diameter that the free flow of fluid therein is precluded. A typical example of such formations is the quartz type of oil sand of an oil bearing formation in which the pore space is so small as to constitute a capillary lock for the fluid therein. In such types of formation, the recovery of fluid therefrom is usually very slow and is a costly and time consuming operation, frequently necessitating the employment of such secondary recovery methods as gas or water drives, as well as various types of fracturing processes.

The most commonly employed fracturing process, which is intended to sufficiently fracture the fluid producing formation so as to facilitate the drainage of fluid and the recovery of fluid therefrom, is to introduce a fluid into predetermined zones of permeability of the productive formation from a well bore and then either apply pressure to said fluid or expand the fluid whereby to open up or create fissures in the formation. As will be readily apparent, such methods, at best merely produce fissures in a single horizontal plane in the formation which radiate from the well bore. Usually, however, such fissures do not extend through the entire vertical height or depth of the formation, and thus, only a portion of the fluid stored in the formation can be effectively recovered by such methods.

In many such prior conventional methods, the fracturing fluid being directly applied to the formation to be fractured, is frequently released and lost into permeable regions when the formation begins to fracture, thus preventing complete fracturing of the formation. To overcome this fatal defect in such methods, relatively expensive and time consuming multi-fracturing is necessary throughout the productive formation.

The primary aim of this invention is to secure a fracturing of the fluid bearing formation from which it is desired to recover a valuable fluid, in such a manner that the formation may be completely broken, and if desired, in a single fracturing operation, from top to bottom thereof by vertical fissures or crevices which extend radially from the well bore, whereby substantially all of the fluid content of that portion of the formation to which the method of this invention is is applied, may be effectively recovered.

The improvement presented by the present invention over that disclosed in my prior filed application Serial No. 490,482, resides primarily in the utilization with the methods of this prior application, of high frequency energy bearing or sonic waves, effectively applied to the productive strata in a variety of different means in order to enhance the fracturing operation therein and to facilitate the driving of the fluids therefrom; or in the application of high frequency energy bearing or sonic waves adjacent deformable strata to facilitate the fracturing of the same, as desired, or to apply through such deformable strata a vibratory action to the productive formation.

Another very important purpose of the present invention is to provide a method for fracturing a productive formation which shall include the application of high frequency vibratory or sonic waves thereto, and wherein if desired the fracturing method may be performed without contamination of the formation by the fracturing fluid; and without loss of fluid from the productive formation.

Yet another very important object is to provide a method, including the application of a fluid medium under pressure to a productive formation and the use of high frequency energy bearing or sonic waves therewith, as set forth above, wherein the fracturing fluid need not be released or withdrawn before producing from the formation; and may be retained in readiness for the further application of fracturing or treatment of the productive strata.

Further specific objects of this invention are to provide methods in which the advantages of the application of high frequency vibrations or sonic waves may be realized, whereby fracturing pressure may be applied to a fluid containing formation for the recovery of fluids therefrom in the improved modes such that the area or zone of the formation being fractured may be more accurately controlled than has been heretofore possible; whereby a more complete and effective fracturing of the formation from top to bottom within a selective zone may be obtained; whereby in some of the methods herein disclosed a formation may be disrupted or fractured during the process of recovering fluid therefrom and without interrupting such fluid recovery; and wherein selected portions of a formation may be successively fractured as desired.

Additional objects are to provide methods whereby productive formations may be fractured and displaced by applying pressures to adjacent elastic strata; and whereby displacement of such elastic strata may be continued or varied, during the use of several of the methods taught herein, while producing from the productive formations, and wherein the above results may be greatly enhanced by the use of high frequency vibrational or sonic waves.

Another object is to provide a method including the use of high frequency vibrational or sonic waves in accordance with the foregoing objects whereby gravity drainage may be employed for a fractured formation and may be continued after the productive pressure residual in the productive formation has been dissipated.

Yet another purpose is to provide a method for more completely fracturing through the use of high frequency vibrational or sonic waves, a productive formation by applying a fracturing force to the underside of a formation for partially fracturing the same and by utilizing the weight of the over-burden to subsequently apply a fracturing force to the upper side of the formation to complete the fracturing thereof.

Further specific and important objects of the invention are to provide a fracturing process, including the use of high frequency energy carrying or sonic waves for the recovery of fluids from geological formations, which may be performed in conjunction with conventional methods of fluid recovery and flow acceleration from oil bearing and other formations.

These, together with other objects and advantages which will be subsequently apparent, reside in the details of construction and operation as more fully hereinafter described and claimed, reference being had to the accompanying drawings forming a part hereof, wherein like numerals refer to like parts throughout, and in which:

Certain geological formations, and especially those from which valuable fluids are recovered, such as the petroleum bearing oil sands, are characterized by extreme hardness and brittleness. Such formations are substantially non-deformable under pressure, and consequently, when subject to sufficient pressures, may be crushed or shattered in much the same manner as a pane of glass. Frequently, such brittle strata are juxtaposed or are adjacent to a deformable formation on the top, or bottom sides, or both, such as limestone, shale and the like. These subterranean deformable formations, under the pressures and temperatures existing, may be bent or deformed to a considerable extent before fracture occurs therein.

Although the present invention is not limited thereto, it is specifically applicable to such associated brittle and deformable formations to effect a more efficient and a more economical recovery of fluids from a fluid bearing strata of a brittle type. In the accompanying drawings, there has been diagrammatically illustrated a number of modes of applying the fundamental concept of this invention in geological formation of the character above referred to, and the accompanying specification describes satisfactory modes of practicing the methods involved.

Figure 1:
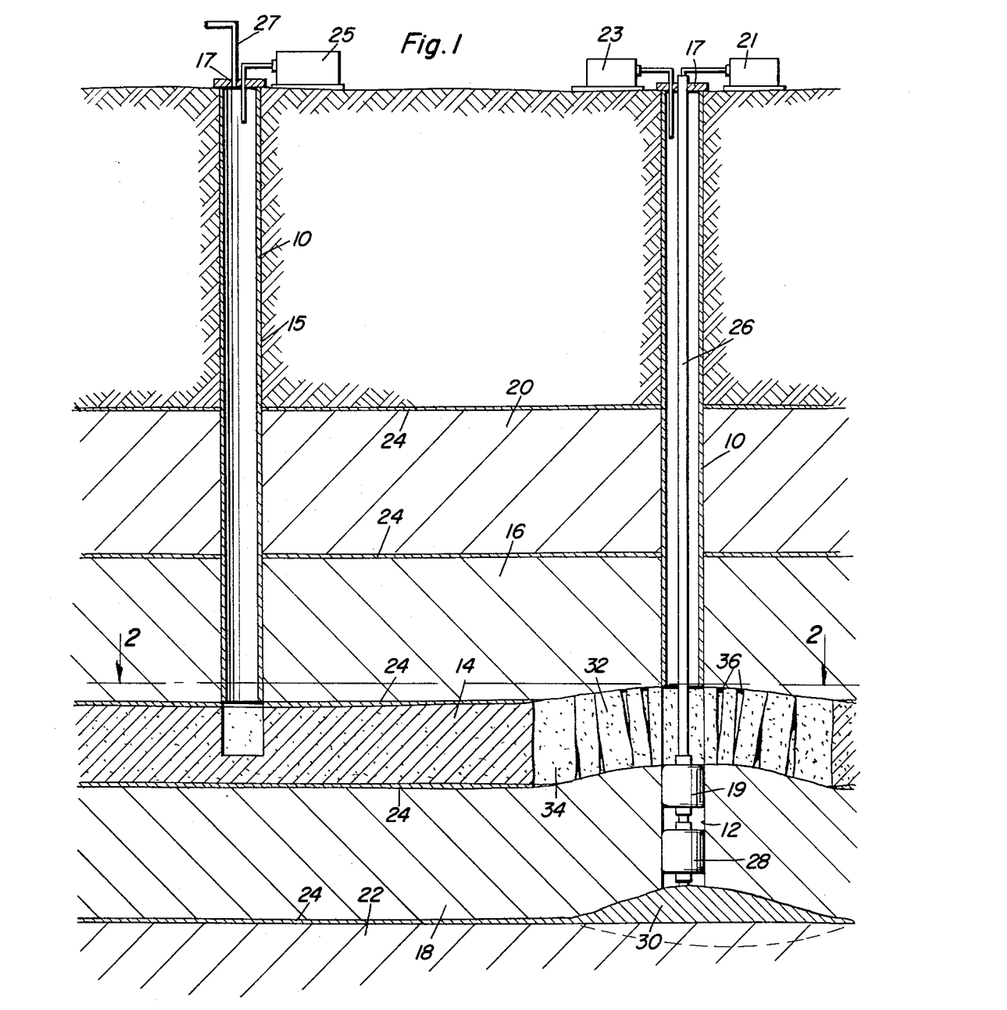
FIGURE 1 is a diagrammatic view illustrating in vertical section a portion of a subterranean formation with a well bored therein, and with a pressure drive bore for the secondary recovery of fluid from the formation, and illustrating a simple method of applying a basic concept and principle of this invention thereto, and is taken substantially upon the plane indicated by section line 1—1 of FIGURE 2.
Figure 2:
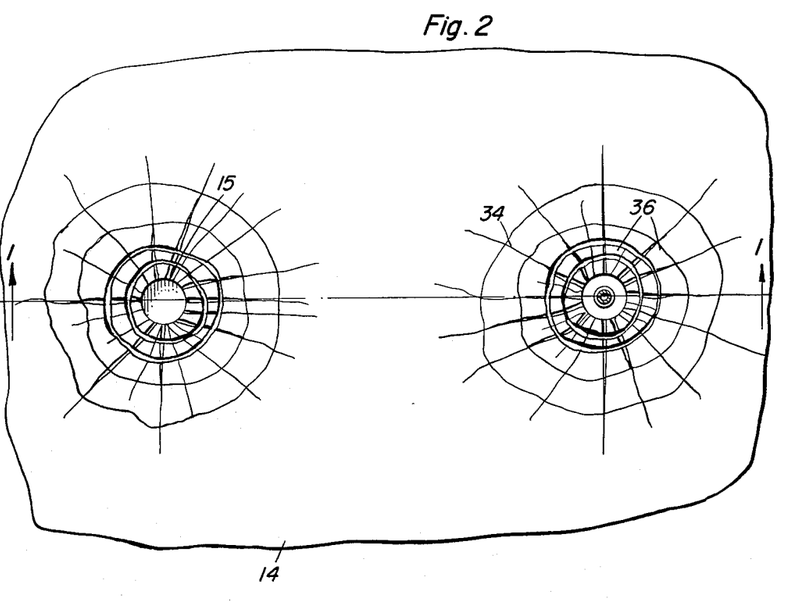
FIGURE 2 is a horizontal sectional view taken substantially upon the plane indicated by section line 2—2 of FIGURE 1.

*Method of FIGURES 1 and 2*

In FIGURE 1, there is disclosed a well casing 10 which is applied in a well bore 12 in a geological formation. The well bore extends through the hard, brittle fluid producing formation, such as an oil bearing strata 14. Shown at 16 is an overlying deformable formation strata, such as limestone, shale or the like, while at 18 is disclosed an underlying deformable formation strata of a similar character. What may be further deformable formation strata are indicated at 20 and 22 above and below the productive strata 14. Indicated at 24 are the interfaces between successive layers of the geological formation, these interfaces usually being shale or clay, as is well known. However, these interfaces 24, as defined hereinafter in the specification and the claims, are not limited to those natural boundaries existing between successive layers of the geological formation, but may include those boundaries caused to exist by induced splits or fractures caused to happen by any of the presently well known formation rupturing methods, within any of the layers of the deformable formation or formations adjacent the productive formation 14. The determining factor for use of the following methods being that there be a portion of substantially deformable strata between the natural or induced interface and the productive strata or formation 14.

The casing 10 of the well bore is preferably terminated just above the productive strata 14 although it could extend through the productive strata and be perforated for communication therewith in accordance with conventional practice, the bore 12 being continued below the strata and preferably below the immediate or the next adjacent underlying deformable formation 18, and into the interface 24 between the strata 18 and the successive underlying strata 22.

A string of piping or tubing 26 is positioned at the well bore 12, and a conventional packer 28 is employed in the lower portion of the well bore 12 in the bottom of the deformable formation strata 18 and at the interface 24 therebeneath. A suitable fluid medium under pressure, which is preferably liquid, but may be gaseous in nature if desired, is supplied through the string of tubing 26 to the interface 24 below the strata 18 and is forced into this interface. Under this fluid pressure, the deformable strata 18 is forced or lifted upwardly, the pressure fluid being disposed in a pressure chamber or space 30 which is thus formed in the interface 24 between the formation strata 18 and 22. The upward deformation of the strata 18 in turn forces the super-incumbent portion of the brittle strata upward. Since the strata 14 is not deformable, the pressure applied thereto causes splintering and shattering throughout it and the fractured portion of the strata 14 is then likewise forced upwardly as indicated by the portion 32 in FIGURE 1, being forced upwardly into the deformable lower portion of the strata 16.

When a brittle, hard plate like material, such as a plate of glass or quartz sand strata 14 has pressure applied to a point thereon, the material shatters or fractures with a series of vertical crevices or fractures 34 opening radially from the point at which the pressure is applied, this being the well bore in this situation illustrated in FIGURES 1 and 2. At the same time, such shattering or fracturing is accompanied by one or more circular vertical fractures 36 which are generally concentric with the center of the pressure, as shown in FIGURE 2.

It is to be particularly noted that by reasons of the vertical lifting of the layer 14, the fractures 34 and 36 will extend throughout the entire vertical height or depth of the layer. Thus, that portion of the layer subjected to the fracturing force applied below the packer 28 and below the deformable strata 18 by the string of tubing 26, will be thoroughly broken into relatively small pieces, and a number of crevices and passages will be opened extending from the top to the bottom of the productive strata and throughout various portions of the same. Any fluids within the productive strata and which would otherwise be retained therein by virtue of the small sizes of the pores or passages of the formation will now be more freely liberated and may be recovered in any desired conventional manner. Usually, these fluids are recovered either by flowing or by pumping from the interior of the casing 10. Since the operation of this method is not dependent upon any particular mode of recovery of fluids released from the formation by the fracturing of the same, illustration and further description as to the recovery of the fluids is deemed to be unnecessary to an understanding of the invention as claimed herein.

It will be, of course, apparent that the reverse of the method illustrated in FIGURE 1 may be employed, and the force for fracturing the formation may be applied above the same for fracturing the formation by downwardly applied force. In such instances, the casing 10 would be ended within strata 20, just above interface 24, packer 28 would be moved up within strata 16, and the fluid pressure would be applied through casing 10 into interface 24 thus forcing the strata 16 downwardly upon the frangible strata 14 for bowing the latter downwardly and for fracturing the same in the manner above described. Naturally, in this method of downwardly fracturing strata 14, production of the formation fluids would be through piping or tubing 26.

In the method set forth hereinbefore for practicing the principles of this invention, it will be observed that a fluid pressure, either liquid or gaseous, is applied to a deformable formation which is adjacent to a brittle frangible strata which it is desired to fracture, and the deformable formation is caused to press against the strata for thus shattering the same.

A basic feature of this invention resides in the use of a portion of a relatively deformable strata as a diaphram interposed between the fluid pressure fracturing and manipulating force and the treating forces are operatively applied to the strata being treated, yet direct contact of the treating force medium therewith is prevented.

A number of novel and extremely important advantages arise from this feature. First, there is offered a precision of control of the fracturing process which is not possible in conventional fracturing methods. Since in this method, the pressure fluid need never contact nor penetrate the productive strata, the production from the latter need not be halted during the operation or many of the methods of the fracturing process. Therefore, the effectiveness of the fracturing operation may usually be visually ascertained from inspection of the flow from the productive strata and appropriate changes, as desired, may be immediately made in the application of the fracturing pressure. In conventional methods of fracturing, the fracturing fluid is directly applied to and therefore penetrates the productive strata. This fracturing fluid must be removed before production can be resumed and therefore before the effectiveness of the fracturing operation can be evaluated and corresponding adjustment of the fracturing operation effected. This method therefore saves time and affords a very precise and sensitive control of the fracturing operation.

Second, contamination of the productive strata by the fracturing pressure fluid is completely avoided since the latter need not directly contact the productive strata. In conventional fracturing processes, since the fracturing fluid is directly applied to the productive strata, the fracturing fluid enters the strata as soon as the fracturing of the latter begins. Often, this results in damage to the productivity of the strata and often requires time consuming and expensive operations to correct the detrimental effects upon the same. All this is completely avoided by this method.

Third, there is no loss of fluid pressure or of the pressure fluid, in this method, upon fracturing of the productive strata. In conventional methods, the beginning of the fracturing allows escape of the pressure fluid and also loss of the pressure applied to the formation. Often, this necessitates the starting of one or more additional, new fracturing operations in order to obtain complete fracturing of the strata. In the present method, a simple operation may be temporarily halted and then continued as often as desired until the entire fracturing operation is completed.

Fourth, the present process enables the fracturing of a strata to be accompanied by or subsequently followed by a physical displacement of the strata as part of a single operational procedure, this facilitating recovery of the fluids from the strata. This is obviously impossible in present conventional fracturing methods.

Fifth, in the use of the present method, the height or vertical thickness of the productive zone is of no consequence. In such formations as the Spraberry sands in West Texas, productive strata thicknesses of 300 feet are not uncommon. By the conventional methods of fracturing, owing to the effect of increasing porosity caused by cracks and cavities originating or formed in the strata upon the flow of fracturing fluid into the strata, the quantity of the fracturing fluid required for complete fracturing obviously varies with the thickness of the formation. In this method, however, since the diaphram or sealing action of the deformable layer prevents loss of fluid into the strata, no more fluid is required to completely fracture a 300 foot strata than that required for an approximately 20 foot strata of the Bartlesville sand of northern Oklahoma and Kansas. In fact, the thicker strata tends to fracture more completely than the thinner strata under this method. An enormous saving in the time and expense for fracturing thick strata is obtainable under the present invention.

Sixth, in the present method, there is provided a fluid medium which is acoustically coupled to the brittle strata, at all times, even during the fracturing of the same, which can be employed to transmit energy bearing high frequency or sonic waves to the brittle strata for agitating or otherwise treating the same.

The fracturing process of this method further lends itself admirably to use with fluid pressure drives for the secondary recovery of fluids from a productive strata. As shown in FIGURES 1 and 2, one or more well bores 15 may be employed as sources for fluid pressure drives upon the fluids in the productive strata 14, the driving fluid being applied from the well or wells 15 into the strata 14 for driving fluids towards the bore 12. Conversely, the reverse drive may in some instances be employed. In this phase of the invention, the formation strata 14 adjacent the drive wells 15 is fractured in the same manner as that illustrated and described in connection with FIGURE 1. Since this same apparatus and method may be employed, a description or illustration of the same has been omitted as being merely repetitive.

However, since the strata and the bores 15 are fractured or opened from top to bottom, the drive fluid is able to fill the entire volume of the strata and thereby drive all of the strata fluids to the producing well 12. In contrast, in the conventional methods of pressure drives, the driving fluid travels in channels which cover only fractions of the total area or volume of the strata. Further, in the present invention, the pressure which may be applied to the adjacent deformable strata 16 and 18 enables the drive fluid to be confined therebetween, without loss or escape, to the productive strata.

It should be particularly noted that in this method fractures are produced which extend vertically from the top to the bottom of the brittle frangible formation which is to be shattered, and these fractures radiate outwardly from the well bore in the formation. It will also be observed that since the shattering force may be applied below the productive formation and will shatter the same by an uplifting pressure applied thereto, that there will be no interruption in the continued flowing of a well from that productive strata. This invention, therefore, provides a method whereby substantially complete recovery of all of the fluids of a formation may be had by a complete fracturing of the formation from the top to the bottom thereof, and substantially uniformly throughout the entire area of the producing formation being treated, and this without interrupting flow from the formation.

The foregoing description sets forth the method of applying the invention in order to fracture a productive strata and recover valuable fluids therefrom, as disclosed in my above identified prior filed application. The improvement which comprises the subject of the present application is applicable to the above described method of my prior filed application, as set forth hereinafter.

However, it should be noted that the diagrammatic drawing of pressure fluid chamber 30 as shown in this FIGURE 1 represents this pressure chamber as it would be should the formation strata 22 be of a substantially non-deformable type and this strata 22 be also resting upon yet lower strata of massive nature or other non-yielding and non-deformable characteristics. Should this strata 22, below interface 24 wherein the pressure chamber 30 is built up, be of a yielding or deformable nature, then it is to be realized that deformation of this strata 22 will occur from the influence of the pressure applied into the interface 24 between stratas 18 and 22. It should be considered, however, that such a deformation of lower strata 22 as shown by the dotted line below chamber 30, will in no way deter in the operational success of the method of fracturing shown in this invention, for displacement downwardly of deformable strata, as shown by the dotted line below chamber 30, will cause a displacement of this deformed strata upward against interface 24 between strata 22 and 18, as a pressure ring just beyond the limits of chamber 30, where it will be an augmenting presure means for assisting pressure fluid chamber 30 in fracturing of the productive brittle and frangible strata 14.

Wherein the reverse of the method diagrammatically illustrated in FIGURE 1 is employed, and the force for fracturing the formation is applied above the same for fracturing the formation by a downwardly applied force, then the same condition may exist in the downwardly applied force, as is explained in detail as above to the upwardly applied force. That is to say, that when the pressure fluid chamber 30 is caused to be applied in the interface 24 between stratas 16 and 20, then if strata 20 is of a deformable nature it will be deformed in a similar manner as would strata 22 if it was deformable. However, should strata 20 be overlaid with massive substantially non-deformable strata, then this yielding or deforming of strata 20 would be an augmenting factor in the pressure fracturing of productive strata 14 by the downwardly exerted presure force of chamber 30 applied between stratas 16 and 20.

In order to apply high frequency vibrational or sonic waves to the formation strata in the method of this invention, it is preferred to close the top of the casing 10 as by a casing head 17. The string of tubing 26 extends through this head and is supplied with fluid under pressure as desired. Also, not shown, is the usual provision whereby fluid produced from the strata 14 and flowing up the casing 10 of the well bore 12 may be recovered as desired.

A packer 19 is applied to the well bore 12 immediately below the productive strata 14, the string of tubing 26 extending through the packer as well as through the packer 28, for communication with the interface 24 and the chamber 30 as previously mentioned. It is of course evident that in some instances the equivalent arrangement of a single packer extending throughout the strata 18 may be employed in place of the pair of packers 19 and 28. A pair of high frequency vibratory or sonic wave generators 21 and 23 of any suitable type are provided, respectively communicating with the interior of the tubing 26 and with the interior of the casing 10 through the head 17. The generator 21 applies high frequency vibrations in the form of energy carrying or sonic waves to the fluid within the tubing 26, and thus into the fluid within the chamber 30. In this means, the fracturing fluid serves as a medium for conveying the high frequency vibrations or sonic waves to the deformable strata 18 and from thence to the productive strata 14. The vibrations or sonic waves applied to the deformable strata will facilitate and extend the scope of the deformation of the same by the fluid pressure from the chamber 30.

When high frequency vibrations or sonic waves are to be applied directly to the productive strata 14, the casing 10 and well bore communicating with the productive strata will be filled with fluid recovered from the strata 14 or other fluid medium introduced into the well bore for applying pressure to the strata. The sonic wave generator 23 communicating with the fluid within the casing 10 will directly transmit its high frequency energy carrying or sonic wave, through this fluid, into the strata 14. These high frequency vibrations or sonic waves applied to the productive strata before and/or during the fracturing process, will greatly facilitate and accelerate the fracturing operation due to the vibrational or shaking effect upon the brittle productive strata, as the latter is stressed by the fracturing pressure applied thereto through the adjacent deformable strata, and by the rapid rise and fall of the pressures applied to the strata by the pressures and the high frequency sonic wave imposed thereon through the casing 10 which will assist the internal pressure of the productive strata to disrupt or burst the same.

The high frequency sonic wave generators 21 and 23 may be of any desired character, and accordingly a specific description of construction and operation is believed to be unnecessary. By way of reference, these sonic wave generators may be of the type and operation set forth in my prior co-pending applications Serial No. 241,647, now Patent 2,796,129; Serial No 296,038, now Patent 2,866,-509; and Serial No. 665,995 filed June 17, 1957; and be employed in the various ways disclosed in those applications.

As set forth in detail in those applications, the diagrammatically represented sonic wave generating apparatuses 21 and 23 may be each of a compound nature whereby to produce by means of a carrier wave together with secondary and/or modulated waves, a resultant energy carrying high frequency or sonic wave of any desired characteristic; and the action of the two sonic wave generators 21 and 23, applied from the lower strata and from within the productive strata respectively may likewise be such as to be combined to produce a desired resultant effect.

The principle of applying high frequency vibratory or sonic waves to a productive strata undergoing fracturing, is that of the application of a large number of relatively light blows delivered at a high frequency upon an internally stressed strata and one upon which external stresses are further imposed. The combining of the fracturing pressure with the high frequency vibrations or sonic waves serves to secure much more complete fracturing and disruption of the strata as well as to facilitate or hasten the accomplishment of the same.

It is of course evident that in the methods hereinbefore set forth, the opportunity for visual inspection of the results obtained by the fracturing enable a much more precise control of the entire operation.

When the pressure drive is employed as a part of this method of the invention, it is also possible to combine therewith the benefits obtained by the high frequency vibrational or sonic wave effect. Thus, the upper end of the casing 10 of the well bore 15 is likewise closed as with a head 17 and a further high frequency sonic generator 25 is associated therewith in order to apply high frequency sonic wave operations to the pressure fluid which is supplied and retained within the casing 10 as by a conduit 27 from any suitable pressure source. The pressure drive from bores 15 extend directly to within the productive strata 14, which may be desired to fracture, in order that the driving fluid, whether gas or liquid, supplied by the pipe 27 and casing 10 into the formation may be confined to the productive strata. This fluid, being driven from the bores 15 toward the productive bore 12 will serve as a conveying medium for applying the vibrations and sonic waves from the sonic generator 25 which may be of any desired type, and will thus enable the strata 14 to be treated with vibrations or sonic waves from both sides of the zone lying between the producing and the driving well bores.

In some instances, the vibrational or sonic wave effect imparted to the strata 14 from the driving bores may in itself be sufficient to cause disruption of the strata, especially when the latter is externally stressed by the fracturing pressure from the fluid introduced through the tubing 26 and applied from the chamber 30 and the interface 24 to stress and move the deformable strata 18. In other instances the vibrational or sonic wave effect will merely assist the fracturing pressure in effecting a complete disruption of the strata.

Figure 3:
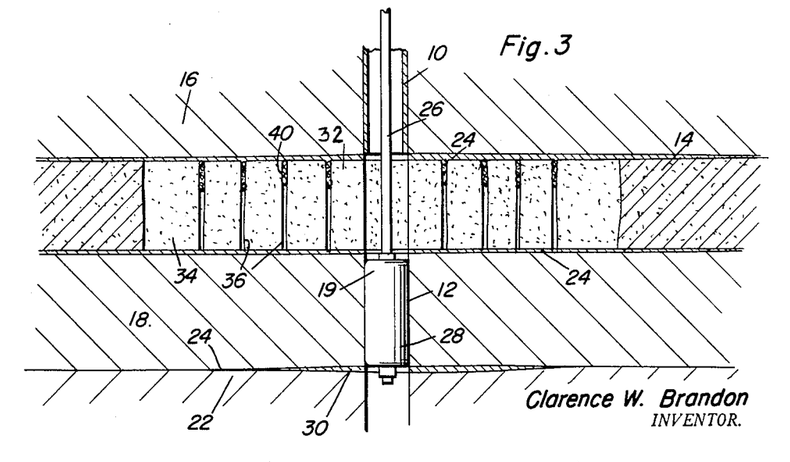
FIGURE 3 is a fragmentary view similar to FIGURE 1 but showing the manner in which the formation, after the treatment in accordance with FIGURE 1 has sand or gravel and/or a sealing agent introduced thereinto, and is further fractured under the pressure of the over-burden.

*Method of FIGURE 3*

FIGURE 3 discloses a portion of the same type of formation illustrated in FIGURE 1. It will be observed that when the fractured portion 32 of the strata 14 is uplifted by the pressure applied therebelow from the chamber 30 in the interface 24 between the strata 18 and 22, the crevices 34 and 36 will be substantially V-shaped, being wider at the top than at the bottom upon that portion of the strata 14 which is radially expanded. In order to augment the fracturing effect and the completeness of the fracture of the formation strata 14, it is considered that gravel or sand may be applied to the top part of the fractured portion of the formation strata 14 in any conventional manner from the lower end of casing 10. The solid particles of gravel or sand will enter the upper portions of the crevices as indicated at 40 in FIGURE 3 and also will travel radially therein from the well bore 12. Any or all of the fluid pressure or vibrational and sonic wave application of FIGURE 1 are intended to be applicable to the embodiment of FIGURE 3.

It is believed evident that the vibrational sonic wave effects imparted to the productive strata will, in agitating and shaking the fractured portion of the same, facilitate the entrance of the gravel or sand into the crevices.

After the sanding or graveling operation has been completed, the pressure applied through the tubing 26 to the underside of the deformable strata 18 may be released, permitting the strata to drop to substantially its original position. Because of the pressure of the over-burden the uplifted portion 32 of the strata 14 will also drop or be depressed to substantially its original position. However, due to this dropping, the wedging action of the sand or gravel will serve to open the vertical and radial crevices from the top to the bottom of the strata, as shown more clearly by the vertically extending passages 36 which as herein shown are of substantially equal width from their top to their bottom ends. Thus, the fractures which extend throughout the entire vertical height of the productive strata 14 are enlarged to more effectively permit drainage of the fluids from the strata and the subsequent recovery of the same in any of the conventional manners above set forth.

It is also to be understood that the sanding or graveling operation may be performed upon the underside of the fractured strata 14 when the latter is fractured and deformed downwardly by pressures applied from above.

In either mode of operation, the application of the high frequency vibrations or sonic waves to the productive strata, during the collapsing of the same toward its original, undisplaced position, will assist the internal expansive pressures applied to the interior of the strata by the wedging action of the gravel or sand therein, to complete the opening of the fractures or crevices from the top to the bottom surfaces of the productive strata 14.

In some productive strata, in which gas occurs in the upper portion with condensate or liquid in the lower portions, it is desirable to retain the pressure of the gas in the strata after fracturing to assist in recovering the liquid therefrom and prevent it being produced with the liquid. For that purpose, any suitable sealing material may be introduced into the upper portion of the fractured strata together with or instead or the above mentioned sand or gravel. The uplifted formation is then lowered whereby the gravel and/or sealing material will be firmly secured in the upper portions of the crevices as shown at 40 in FIGURE 3. The high frequency vibrations or sonic waves will assist in positioning and wedging the sealing material in the crevices in the same manner as with respect to the sand or gravel as previously mentioned.

It will be understood that the feature of the sealing and/or graveling or sanding can be employed in conjunction with any of the other features of the invention disclosed herein.

However, it is to be understood that during the time of the sanding and graveling and/or sealing material placement operation, which is done in a conventional manner, that, naturally, production of formation fluids from productive strata 14 is ceased during this placement operation.

Figure 4:
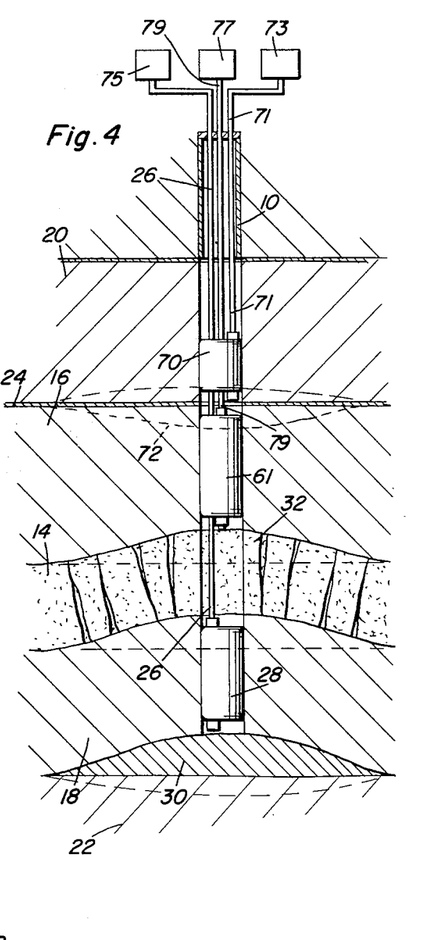
FIGURE 4 is a view similar to FIGURE 1 but showing the manner in which fracturing forces may be applied to both the upper and lower faces of a producing formation, and further illustrating the manner in which high frequency vibrations or sonic waves may be utilized with this form of the invention.

*Method of FIGURE 4*

In FIGURE 4 is illustrated a method whereby in addition to the application of a pressure below the deformable strata 18 by means of the tubing 26 and packer 28, for applying an uplifting and fracturing pressure to the productive strata 14, there may be applied by means of a packer 70 and suitable piping 71 a pressure to the interface 24 between the super-incumbent deformable strata 20 and 16 for deforming the strata 16 downwardly as shown in dotted lines at 72. By this means, pressure may be either selectively applied simultaneously or in alternation, below and above the strata 14 for fracturing the same, and for selectively uplifting or depressing said strata and displacing the same to thereby facilitate complete disruption and fracturing of the strata and if desired, the introduction of sand or gravel and/or sealing material into the crevices of the fractured portion of strata 14.

It will also be understood that the mode of operation of FIGURE 4 may be employed with any of the preceding methods and steps of operation hereinbefore set forth. It is to be particularly noted that the features of the invention disclosed in connection with FIGURE 4 can be employed in conjunction with the other features of the invention set forth in this application.

In this particular method of applying the principles of the invention, it is contemplated that the strata may be repeatedly raised and lowered by selectively applying the pressures thereto to further facilitate disruption of the productive strata.

In applying the principle of high frequency vibrations or sonic waves to the method of FIGURE 4, three sonic wave generators 73, 75 and 77, may be connected respectively to the tubing 71, 26 and 79 for introducing the high frequency vibrations and sonic waves to the fracturing fluids. It is of course understood that the high frequency sonic waves produced by the generators 73, 75 and 77 may be jointly controlled for synchronized joint operation upon the productive strata 14, through the deformable stratas 16 and 18, as well as on the fluid that may be produced through center tubing 79 from the productive strata 14. The generator 73 is acoustically coupled by the pressure fluid to the interface 24 between the stratas 20 and 16 by use of the packer 70 and tubing 71, the generator 75 is acoustically connected by the pressure fluid to the chamber 30 in the interface of the stratas 18 and 22 by the use of the tubing 26 and packer 28; and the generator 77 is acoustically coupled by the produced fluid to the productive strata 14 by use of the tubing 79 and the packer 61.

It is to be understood that production from the strata 14 may be effected in any desired manner, not shown. In this embodiment vibrations or sonic waves may be applied selectively or in various combinations to the deformable stratas 16 and 18 on opposite sides of the productive strata 14 and/or directly to the latter without any interruption to production from the strata 14; and this in conjunction with the pressure drive from adjacent drive well bores as set forth in connection with FIGURE 1.

Also, it is to be noted in the operation of the method of FIGURE 4, that the diagrammatic view as is shown of pressure fluid chamber 30, represents deformable strata 18 as having its lower interface 24 resting upon a substantially non-deformable strata. Should the strata below chamber 30 be deformable, then deformation of chamber 30 would occur down into this lower strata, as shown by the dotted line below chamber 30. This same condition would occur as to upper pressure fluid chamber 72, as seen by the dotted line extending up into strata 20.

Figure 5:
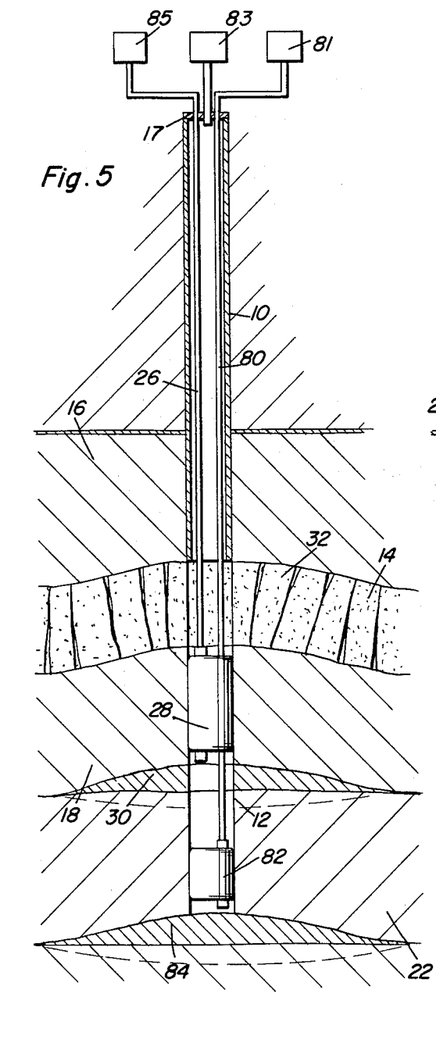
FIGURE 5 is a view similar to FIGURE 1 but showing the manner in which the successive fracturing forces may be applied to a formation at a particular zone thereof, for producing modified characteristics of fracture in the formation, and which method is accompanied by the application of high frequency vibration or sonic waves to the formations.

*Method of FIGURE 5*

FIGURE 5 discloses a still further manner of applying the principles of this invention. Shown therein is the method of fracturing a strata in accordance with FIGURE 1, the same numerals referring to the same elements as in FIGURE 1. Extending through the packer 28 of the well bore 12 which extends through the bottom of a second underlying deformable strata 22, is a second string of tubing 80 which extends through a packer 82 at its lower end and which packer is disposed at the bottom of the strata 22.

When the operation of the method disclosed in FIGURE 1 has been completed in the arrangement shown in FIGURE 5, pressure fluid is supplied through the tubing 80 below the packer 82 and to the interface below the second deformable strata 22. This produces a hydraulic or pressure chamber 84 which upwardly deforms the overlying portion of the strata 22 and causes this upper portion of the same to bear against the lower portion of the previously deformed and upwardly pressed strata 18. In this operation, the fluid pressure previously applied from beneath the packer 28 to the lower side of the strata 18 by the chamber 30 may be either retained in place or, if desired, may be released. In any event, the upward deforming of the strata 22 serves to impart an additional local upward thrust against the lower side of the previously fractured portion 32 of the strata 14, producing local upward thrust along the same, increasing the fracturing action to which the strata was previously subjected as well as extending the same.

In some instances, where the fluid pressure has been retained in the interface between the strata 18 and 22, the further upward thrust imposed by the strata 22 by means of a pressure chamber 84, will serve to cause expansion of the pressure fluid between the strata 18 and 22, thereby extending the region of fracturing, radially from the well bore 12.

It is observed that the method of FIGURE 5 may thus be used to augment or modify to some extent the application of the upward force and the shattering action applied to the strata 14. In applying the principles of high frequency vibration or sonic waves to this form of the invention, the casing 10 is provided with the closure head 17 as previously mentioned, and three sonic wave generators 81, 83 and 85 are provided. The generator 81 is connected with the tubing 80, being acoustically coupled by the pressure fluid to the lower strata 22, while the generator 85 is acoustically coupled to chamber 30 by the pressure fluid through tubing 26 and the generator 83 communicates with the interior of the casing 10, being thereby directly coupled acoustically by produced fluid to the strata 14, all as previously described and set forth herein. The fluid pressure drive with or without the application of the high frequency sonic waves may also be be employed with this method.

The fracturing operations can thus be greatly facilitated by the high frequency vibrations and sonic waves applied in conjunction therewith, and to some extent can be directionally controlled.

In the diagrammatic drawing of FIGURE 5, the bottom part of pressure fluid chamber 84 is shown as being substantially nondeformed. This would be the case if the strata existing below deformable strata 22 were of a non-deformable character. Where this lower strata below strata 22 was of a deformable nature, then pressure fluid chamber 84 would cause some deformation in this lower strata, as shown by the dotted line below chamber 84. Also, there would be some deformation downwardly into deformable strata 22 from the pressure fluid chamber 30, as shown by the dotted line below chamber 30, which however would tend to assume its original level, from the pressure exerted by lower chamber 84.

Figure 6:
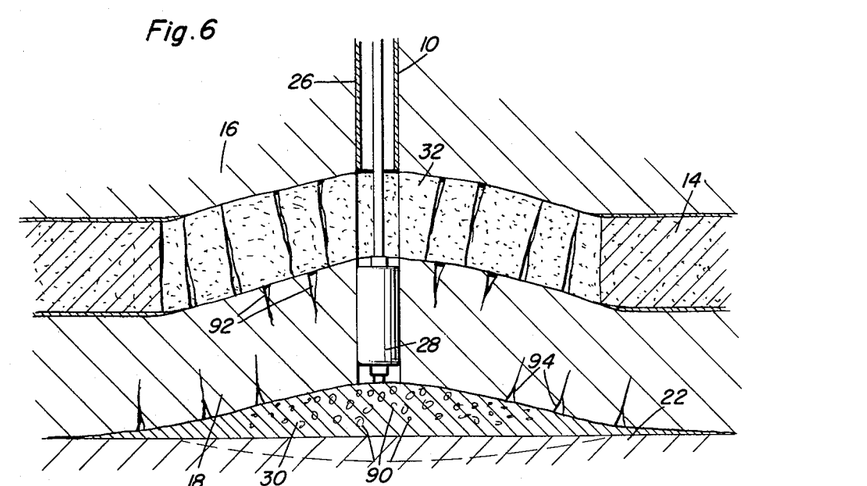
FIGURE 6 is a view similar to FIGURE 1 indicating the further adaptation of the method of this invention wherein a formation to be fractured may be also fractured to constitute a drainage for the producing formation.
Figure 7:
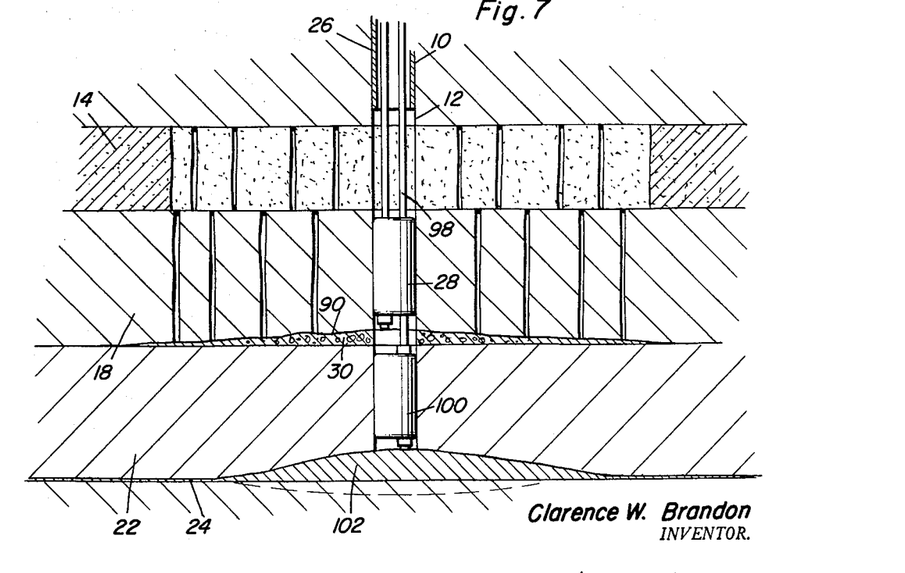
FIGURE 7 is a view similar to FIGURE 6 and illustrating a further stage of the method of FIGURE 6 in which the underlying formation has also been fractured to constitute a fluid drainage and collecting zone for the recovery of fluids from the fractured overlying producing formation.

*Method of FIGURES 6 and 7*

In the preceding applications of the methods of this invention, it has been assumed that the fluid which is released by shattering or rupturing of the strata 14 will be recovered directly from that strata. In some instances, however, it may be preferable, as where there is an unavoidable loss of fluid downwardly from the ruptured portion 32 of the strata 14 into the lower deformable strata 18, to drain and recover this fluid from beneath the strata 18. For this purpose, the method disclosed in FIGURES 6 and 7 is believed to be especially effective.

In practicing this method, the method in accordance with FIGURE 1 may be first applied if desired, in order by deforming and uplifting strata 18, to cause fracturing of the portion 32 of the strata 14 as shown in FIGURE 6.

Moreover, as the previously mentioned pressure chamber 30 is supplied with pressure fluid, the upwardly deformed and uplifted portion of the deformable strata 18, gravel or sand 90 may be fed with the pressure fluid into the chamber 30. It is evident that although the strata 18 will deform or bend to a considerable extent before fracture will occur, that the deforming operation may be continued until such fractures will eventuate. In FIGURE 6, it is assumed that the application of pressure has continued until the deformable strata 18 begins to have fractures or cracks 92 extending downwardly from its upper surface and cracks 94 extending upwardly from its lower surface. In FIGURE 6, these fissures or cracks have not progressed entirely through the vertical extent of the strata.

There is also provided a separate string of tubing 98 which extends past the packer 28 and through a lower packer 100 disposed at the bottom of a lower deformable strata 22 and into the interface 24 therebeneath whereby to lift the strata 22 as shown in FIGURE 6 and thereby exert a fracturing pressure on the upward deformable strata 18, resulting eventually in complete fracture of the latter. Thus, the strata 14 and 18 may be fractured and retained in an uplifted position and the pressure of the chamber may be released, thereby permitting the liquids of the productive strata 14 to be collected by gravity and/or the gas pressure in the upper portion of the strata 14 into the strata 18 for recovery through the well bore 12.

When desired, the pressure of the chamber 30 and or the chamber 102 below the packer 100, may be released and the strata 14 and/or 18 allowed to descend, as shown in FIGURE 7.

The application of pressure to the chamber 30 may be continued until the fissures 92 and 94 extend completely through the strata 18. Alternatively, it may be discontinued in substantially the position or stage of operation as shown in FIGURE 6 and with the fractures extending vertically either wholly or partially through the strata 18, the pressure may be released permitting the productive strata 14 and the deformable strata 18 to settle substantially into their original position as shown in FIGURE 7. In this position, it will be observed that the portion 32 of the strata 14 has been completely fractured, and further that the underlying portion of the strata 18 has also been completely shattered. The gravelled region 90 beneath the fractured portion of the deformable strata 18 serves to permit drainage of fluids from the productive strata 14 and the fissured strata 18 to the well bore 12 from which they may be recovered in the usual manner.

It is an important feature of this invention that the methods hereinbefore set forth may be employed without interference with other conventional methods employed during the production of wells. Thus, any of the conventional methods of sealing formations against the loss of fluid thereinto may be employed, while underwater wells may be completed or their flow stimulated through the application of the method of this invention thereto. Still further, it is evident that treatments in accordance with the above invention may be easily repeated, as desired, from time to time.

The previously mentioned features of sanding or graveling or sealing directly into the fractures within strata 14 may likewise be employed with this last feature of the invention, except that it may be seen that necessarily production of formation fluids through casing 10 would be required to be halted during this type of treatment to the strata 14.

Further, the chamber 102 may be employed to extend the area of the fractured portion 32 while fluid is being recovered therefrom, through the fissured strata 18. In this mode of opeation, the pressure fluid is drained from the chamber 30, since the strata 18 now constitutes merely a supporting and drainage means for the fractured strata 14.

In contrast to previously known methods wherein fracturing of a productive strata necessarily was halted during the production of fluids therefrom, this feature of the invention enables the fracturing process to be freely continued without interfering with the continuing production of the strata.

In the method disclosed in connection with FIGURES 6 and 7 it is intended that energy carrying sonic waves shall be slectively or in various combinations applied to the various strata and/or to a fluid pressure drive, in accordance with the explanations of the preceding embodiments. Such vibrations and sonic waves will assist in the actual fracturing, the migration of the fluids in the strata and in the actual deforming of the deformable strata.

In general, in this invention, the sonic energy waves may be applied singly to any strata or to any interface; to the pressure drive fluid; to the production flow of the productive strata; or to any desired combination of these.

Although in illustrating methods in accordance with this invention the deformable strata are shown as being immediately adjacent the brittle strata, the invention is not limited thereto, since the interposition of other strata, whether brittle or deformable, between the productive strata and the deformable strata may be utilized for applying the pressure fluid.

An interesting and important feature of this invention is that the friction between the sand particles produced by their relative movement during displacement of the strata as above set forth and/or the action of the high frequency vibrations and sonic waves, will generate heat, the latter assisting in the flow of fluids in the producing strata and their recovery therefrom.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. The method of fracturing a productive relatively brittle stratum penetrated by a well bore wherein a relatively deformable non-productive stratum is in operative pressure transmitting and vibration transmitting relation with said brittle stratum, which comprises
 packing off said well bore to confine a face of said deformable stratum remote and isolated from said brittle stratum,
 supplying pressure fluid through said well bore to said confined face,
 applying a force to said pressure fluid to deform said deformable stratum into pressure applying relation to said brittle stratum, and
 simultaneously applying to said fluid an energy carrying sonic wave having a periodic vibration of at least one of said brittle and said deformable strata and of sufficient magnitude to thereby cause fracture of said brittle stratum.

2. The method of claim 1 wherein the energy carrying sonic wave is applied directly to the brittle stratum.

3. The method of claim 1 wherein the energy carrying sonic wave is applied directly to the brittle stratum and to the deformable stratum.

4. The method of fracturing and producing fluids from a relatively brittle productive stratum in a geological formation penetrated by wells wherein a relatively deformable stratum is in operative pressure and sonic wave transmitting relation with said productive stratum, which comprises
 producing fluid from said productive stratum from a first well bore therein,
 applying a drive fluid through a second well to said productive stratum at a location remote from said first well bore whereby to drive formation fluid in said productive stratum towards said first well bore,
 packing off said first well bore to confine a face of said deformable stratum remote and isolated from said brittle stratum,
 supplying a pressure fluid to said face of said deformable stratum which is remote and isolated from the productive stratum and deforming thereby said deformable stratum so as to cause fracturing therewith in the brittle productive stratum while
 simultaneously acoustically coupling an energy carrying sonic wave having a periodic vibration with at least one of said strata.

5. The method of claim 4 wherein the energy carrying sonic wave is directly coupled by pressure fluid with the brittle stratum.

6. The method of claim 4 wherein an energy carrying sonic wave is directly coupled by pressure fluid with the brittle stratum and to the deformable stratum.

7. The method of claim 4 including acoustically coupling an energy carrying sonic wave having a periodic vibration with the drive fluid.

8. The method of fracturing a relatively brittle stratum in a geological formation penetrated by a well wherein relatively deformable strata are disposed on opposite sides of said brittle stratum and are in pressure and sonic wave transmitting relation therewith, which comprises
 packing off said well bore to confine a face of each of said deformable strata so as to be remote and isolated from said brittle stratum,
 alternately supplying a separate fluid pressure medium through said well bores to each of said confined faces and thereby cause each deformable stratum to deform and apply an alternating fracturing force to opposite sides of said brittle stratum, and simultaneously applying an energy carrying sonic wave to each of said fluid pressure mediums.

9. The method of claim 8 wherein the energy carrying sonic waves are applied simultaneously to produce a resultant sonic wave in the brittle stratum.

10. The method of claim 8 including the step of applying an additional energy carrying wave directly to the brittle stratum.

11. The method of fracturing a relatively brittle productive stratum in a geological formation penetrated by a well wherein a pair of relatively deformable strata are disposed on the same side of said brittle stratum and are in pressure and sonic wave transmitting relation therewith, which comprises packing off said well bore to confine a face of each of said deformable strata so as to be remote and isolated from each other and from said brittle stratum, supplying a separate fluid pressure medium to each of said faces and thereby cause each deformable stratum to deform toward said brittle stratum and apply a fracturing force to said brittle stratum, and simultaneously applying an energy carrying sonic wave to each of said fluid pressure mediums.

12. The method of claim 11 wherein the fluid pressure mediums are applied periodically and in alternation.

13. The method of claim 11 including the step of applying an additional energy carrying sonic wave directly to the brittle stratum.

14. The method of fracturing a relatively brittle productive stratum in a geological formation penetrated by first and second spaced wells wherein a pair of relatively deformable strata are disposed upon one side of said relatively brittle stratum and each deformable stratum is in pressure and vibration transmitting relation with said brittle stratum, which comprises packing off said first well bore to confine a face of said deformable stratum nearer to said brittle stratum so as to be remote and isolated from said brittle stratum, supplying a first fluid medium under pressure through said first well bore to said confined face for deforming said nearer deforamble stratum and causing fracturing pressure to be exerted thereby against said brittle stratum, applying an energy carrying sonic wave to the first fluid medium for treating the brittle stratum, packing off said second well bore to confine a face of said deformable stratum nearer to said brittle stratum so as to be remote and isolated from said brittle stratum, supplying a second fluid medium under pressure through said second well bore to said confined face to thereby deform said remote deformable stratum to exert pressure upon the nearer deformable stratum, and thereby employing the last mentioned exerted pressure to extend the area in which the first fluid medium and its energy are applied to the nearer deformable stratum.

15. The method of claim 14 including the step of adding an energy carrying sonic wave to the second fluid medium thereby to increase the pressure exerted thereby.

16. The method of claim 14 including the step of applying an additional energy carrying sonic wave directly to the brittle stratum.

References Cited by the Examiner

UNITED STATES PATENTS

| 2,547,778 | 4/1951 | Reistle | 166—42.1 |
| 2,670,801 | 3/1954 | Sherborne | 166—177 X |
| 2,838,117 | 6/1958 | Clark et al. | 166—42.1 |
| 2,866,509 | 12/1958 | Brandon | 166—177 X |
| 2,871,943 | 2/1959 | Bodine | 166—177 |

FOREIGN PATENTS 654,454  12/1962  Canada.

CHARLES E. O'CONNELL, *Primary Examiner.*